(12) United States Patent
Howarth et al.

(10) Patent No.: US 9,474,392 B2
(45) Date of Patent: Oct. 25, 2016

(54) METHODS AND SYSTEMS FOR DISPLAYING A PRODUCT

(71) Applicant: Apple Inc., Cupertino, CA (US)

(72) Inventors: Richard P. Howarth, San Francisco, CA (US); Wesley Bryan Hamm, San Francisco, CA (US); Federico F. Tio, La Canada, CA (US); Frank Craig Thaler, Santa Cruz, CA (US); Russell John Kaaihue Heirakuji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 13/652,038

(22) Filed: Oct. 15, 2012

(65) Prior Publication Data

US 2014/0106608 A1 Apr. 17, 2014

(51) Int. Cl.
| | |
|---|---|
| *F16M 13/02* | (2006.01) |
| *A47F 7/024* | (2006.01) |
| *F16M 11/04* | (2006.01) |
| *F16M 13/00* | (2006.01) |

(52) U.S. Cl.
CPC ........... *A47F 7/0246* (2013.01); *F16M 11/041* (2013.01); *F16M 13/00* (2013.01); *F16M 13/02* (2013.01); *Y10T 29/49826* (2015.01)

(58) Field of Classification Search
USPC ........... 248/121, 122.1, 127, 918; 340/568.1, 340/568.2, 568.3, 568.8
See application file for complete search history.

(56) References Cited

U.S. PATENT DOCUMENTS

| | | |
|---|---|---|
| 5,906,031 A | 5/1999 | Jensen |
| 6,476,717 B1 | 11/2002 | Gross et al. |
| 7,154,039 B1 | 12/2006 | Marszalek et al. |
| 7,209,038 B1 | 4/2007 | Deconinck et al. |
| D599,241 S | 9/2009 | Andre et al. |
| 7,710,266 B2 | 5/2010 | Belden, Jr. et al. |
| 7,724,135 B2 | 5/2010 | Rapp et al. |
| 7,748,669 B2 * | 7/2010 | Lu et al. .................... 248/181.1 |
| D645,047 S | 9/2011 | Wike |
| 8,145,821 B2 | 3/2012 | Mead et al. |
| 2007/0145211 A1 | 6/2007 | Marsilio et al. |
| 2008/0169923 A1 | 7/2008 | Belden et al. |
| 2009/0173863 A1 * | 7/2009 | Crown ....................... 248/316.4 |
| 2009/0229089 A1 | 9/2009 | Galant |
| 2011/0068919 A1 * | 3/2011 | Rapp et al. ................ 340/568.2 |
| 2012/0037783 A1 | 2/2012 | Alexander et al. |

(Continued)

FOREIGN PATENT DOCUMENTS

GB 2481370 A 12/2011

OTHER PUBLICATIONS

U.S. Appl. No. 12/968,218, inventors Oehl et al., filed Dec. 14, 2010.

(Continued)

*Primary Examiner* — Steven Marsh
(74) *Attorney, Agent, or Firm* — Sterne, Kessler, Goldstein & Fox P.L.L.C.

(57) ABSTRACT

A display system may include a retaining puck for retaining a product, the retaining puck including a main body having a side surface and a bracket recess, wherein at least a portion of the side surface is continuous except for the bracket recess, and a bracket having a mounting flange configured to mate with the bracket recess, wherein the mounting flange is received by the bracket recess, and an outer surface of the mounting flange is aligned with the continuous portion of the side surface of the main body.

22 Claims, 10 Drawing Sheets

(56) References Cited

U.S. PATENT DOCUMENTS

2012/0188082 A1\* 7/2012 Berglund et al. .......... 340/568.2
2012/0280810 A1\* 11/2012 Wheeler .................. 340/539.11
2013/0026309 A1 1/2013 Ball et al.
2014/0060218 A1\* 3/2014 Bisesti .................. F16M 11/04
 73/865.8

OTHER PUBLICATIONS

Notification of Transmittal of the International Search Report and the Written Opinion of the International Searching Authority, or the Declaration in PCT/US2015/012467, mated Jul. 20, 2015, 18 pages.

\* cited by examiner

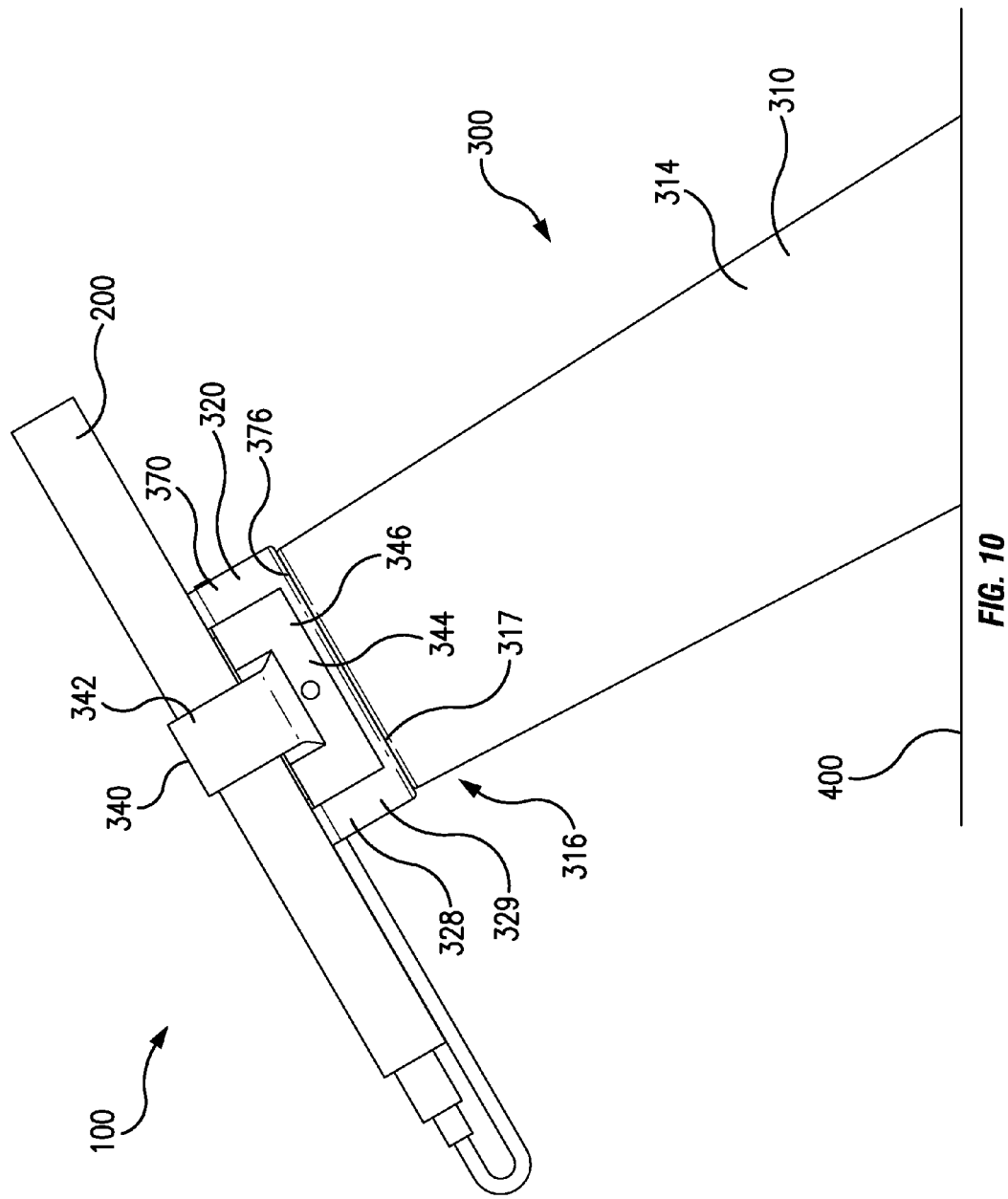

METHODS AND SYSTEMS FOR DISPLAYING A PRODUCT

BACKGROUND

1. Field

Embodiments of the present invention relate to methods and systems for displaying a product.

2. Background

A retailer or other person may desire to make a product available for use (e.g., testing) by a potential purchaser or other person. In some cases, the retailer may further desire to limit the potential purchaser's ability to remove the product from a display area.

BRIEF SUMMARY

A retailer may have a display model product that is representative of products that are available for purchase by a purchaser. In order to entice such a purchase, the retailer may make the display model available for use by the potential purchaser. To promote such use, a retailer may further desire to present the product in a consistent and aesthetically-pleasing way, thereby further enticing the potential purchaser to handle and test the item, and to minimize the interference of elements of a display stand with the potential purchaser's viewing and use of the product. The retailer, however, may desire to limit the ability of the potential purchaser to remove the display model from a display area (e.g., to prevent theft or other unauthorized use).

To accomplish this, the retailer may use a display system or elements thereof according to embodiments described herein.

For example, some embodiments provide a retaining puck for retaining a product, the retaining puck including a main body having a side surface and a bracket recess, wherein at least a portion of the side surface is continuous except for the bracket recess, and a bracket having a mounting flange configured to mate with to the bracket recess, wherein the mounting flange is received by the bracket recess, and an outer surface of the mounting flange is aligned with the continuous portion of the side surface of the main body.

Also for example, some embodiments provide a display system, including a retaining puck having a main body having a side surface, and a display stem having an outer surface defining a shape at its proximal portion that corresponds to a shape defined by the side surface of the retaining puck, wherein the outer surface of the display stem at its proximal portion is aligned with the side surface of the main body of the retaining puck when the retaining puck is coupled to the display stem.

Also for example, some embodiments provide a method for displaying a product, the method including fixing a product to a retaining puck, wherein the retaining puck includes a main body having a side surface and a bracket recess, wherein at least a portion of the side surface is continuous except for the bracket recess, and a bracket having a mounting flange configured to mate with the bracket recess, wherein the mounting flange is received by the bracket recess, and an outer surface of the mounting flange is aligned with the continuous portion of the side surface of the main body, and aligning the side surface of the main body of the retaining puck and the outer surface of the mounting flange with an outer surface of at least a proximal portion of a display stem.

Additional features will be set forth in the description that follows, and in part will be apparent from the description, or may be learned by practice of the invention. Both the foregoing general description and the following detailed description are exemplary and explanatory and are intended to provide further explanation of the invention as claimed.

BRIEF DESCRIPTION OF THE FIGURES

The accompanying figures, which are incorporated herein, form part of the specification and illustrate embodiments described herein. Together with the description, the figures further serve to explain the principles of and to enable a person skilled in the relevant arts to make and use the invention.

FIG. 10 is a side view of the system of FIG. 1.

DETAILED DESCRIPTION

Figure 1:
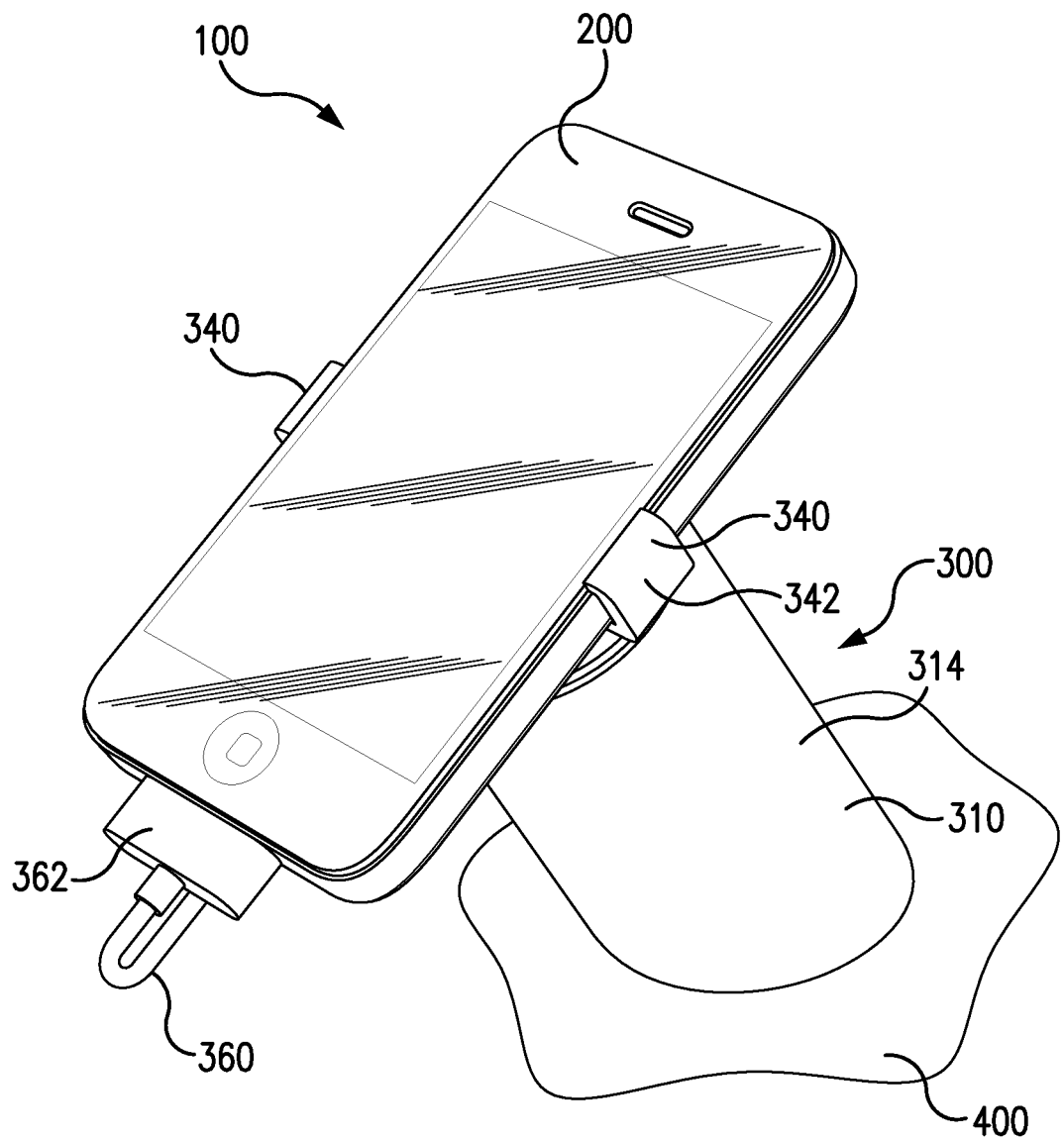
FIG. 1 is a perspective view of a system for displaying a product, with a product thereby displayed, according to an embodiment presented herein.

Embodiments of the present invention will now be described in detail with reference to embodiments thereof as illustrated in the accompanying drawings, in which like reference numerals are used to indicate identical or functionally similar elements. References to "one embodiment", "an embodiment", "some embodiments", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following examples are illustrative, but not limiting, of the present invention. Other suitable modifications and adaptations of the variety of conditions and parameters normally encountered in the field, and which would be apparent to those skilled in the art, are within the spirit and scope of the invention.

A retailer may have a display model product that is representative of products that are available for purchase by a purchaser. In order to entice such a purchase, the retailer may make the display model available for use by the potential purchaser. The retailer, however, may desire to limit the ability of the potential purchaser to remove the display model from a display area (e.g., to prevent theft or other unauthorized use). To accomplish this, the retailer may use a stand as described herein, which may include security features. Although this document describes its display stand in terms of a retailer providing a display model for use by a potential purchaser, the display stand can be applied to any other suitable situation (e.g., any situation where use of an item is desired to be limited) such as, for example, a kiosk where a user may use displayed item, or a customer service station.

A retailer that makes a product available for use by a potential purchaser may further desire to present the product in an aesthetically-pleasing way, thereby further enticing the potential purchaser to handle and test the item, and to minimize the interference of elements of a display stand with the potential purchaser's viewing and use of the product. To further entice the potential purchaser, it may be desired that the display stand be configured to provide a consistent and aesthetically-pleasing appearance, so as to not detract from a potential purchaser's experience when viewing, handling, and testing the item.

Figure 2:
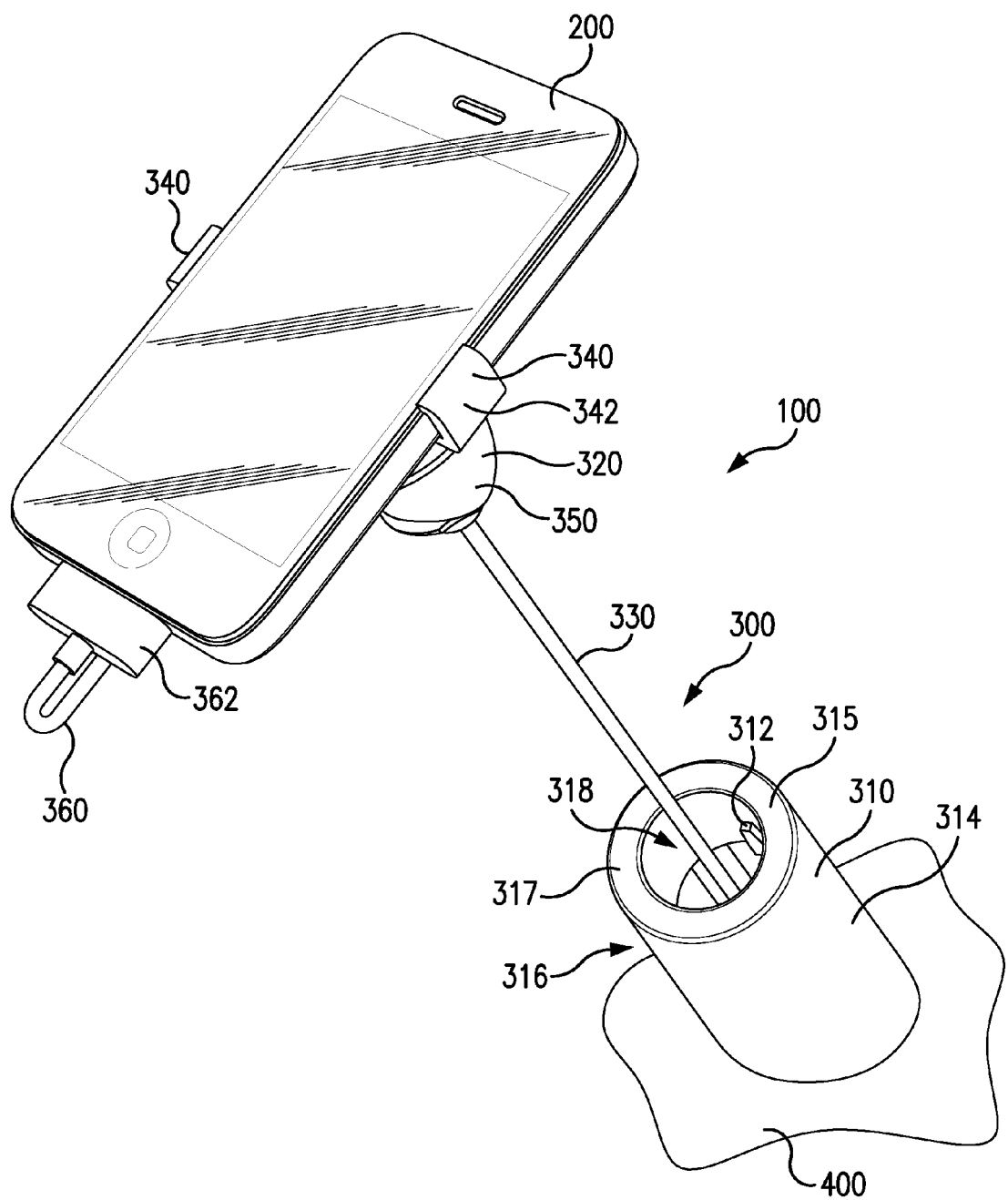
FIG. 2 is a perspective view of the system of FIG. 1 in an extended configuration.
Figure 3:
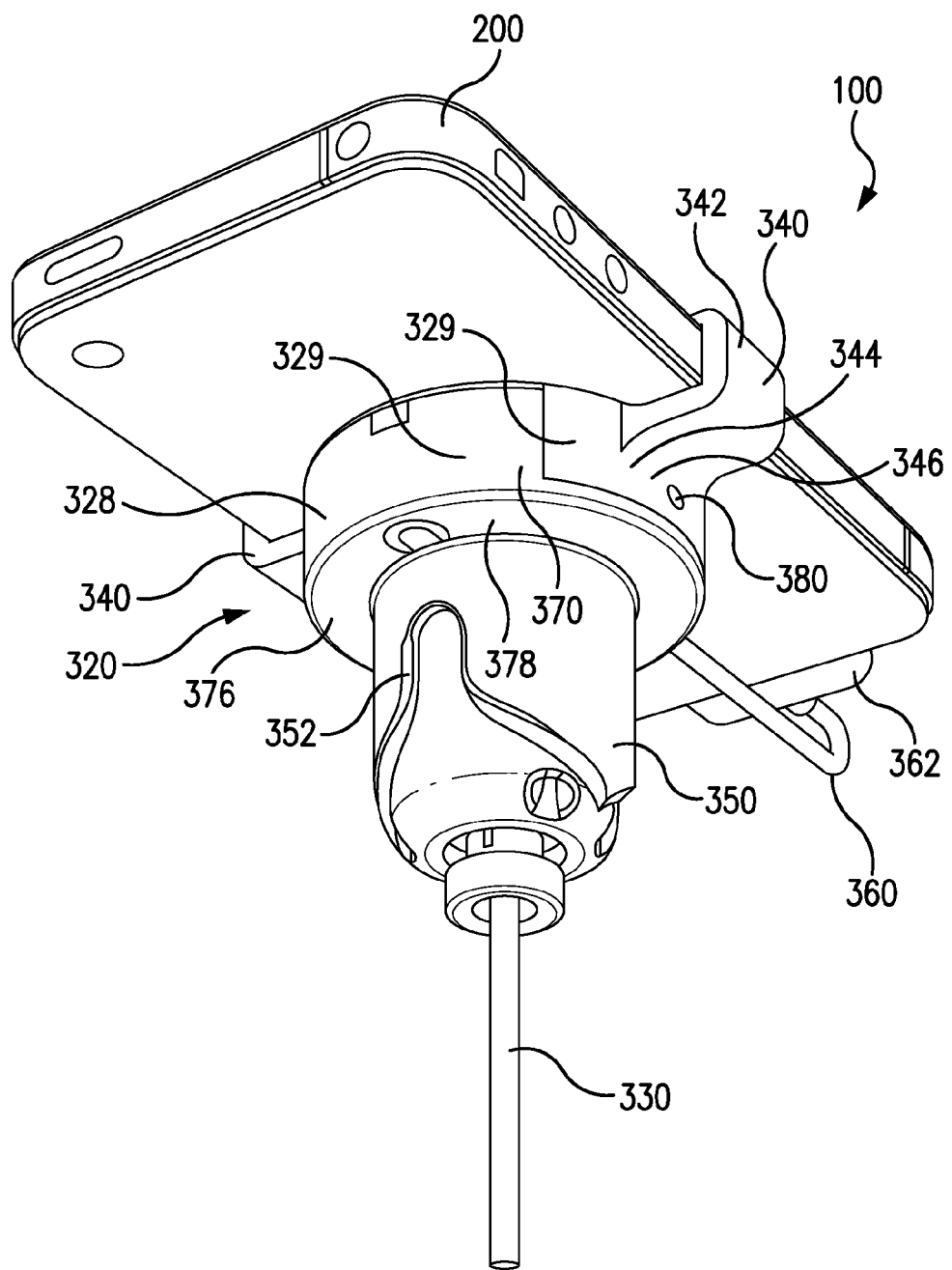
FIG. 3 is a perspective view of a portion of the system of FIG. 1.
Figure 4:
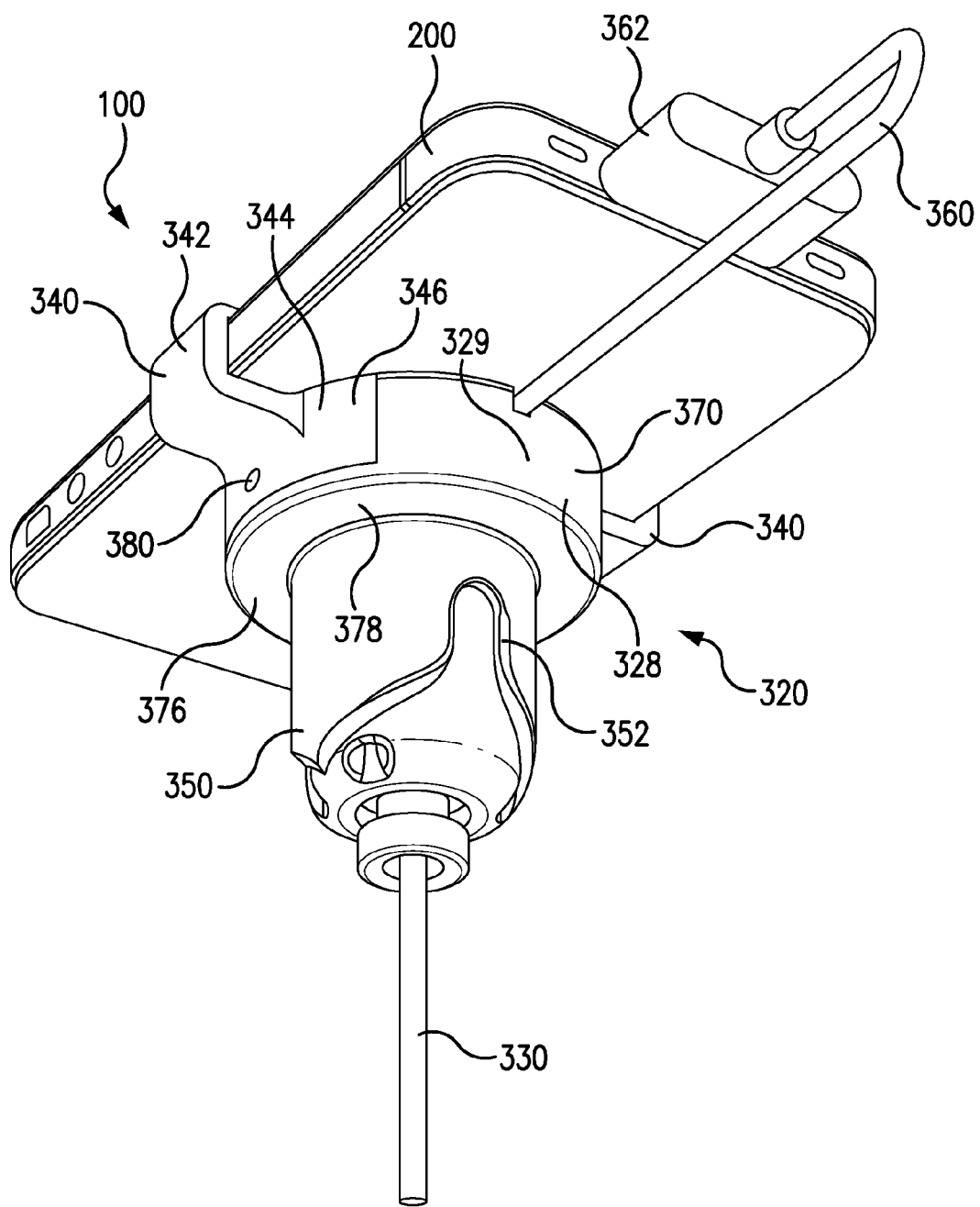
FIG. 4 is a perspective view of a portion of the system of FIG. 1.

The display stand system of the present invention is shown generally at 100 and can include, for example, a product 200 to be displayed, a display stand shown generally at 300 to display product 200, and a display surface 400 upon which display stand 300 is mounted. As shown in FIGS. 1 and 2, display stand system 100 can display product 200 on a display stem 310 (e.g., as in FIG. 1), and can allow product 200 to be moved relative to display stem 310 (e.g., when handled) while still remaining secured (e.g., as in FIG. 2). As shown in FIG. 2, this can be accomplished by a security tether 330 linking display stem 310 and as retaining puck 320 that is coupled to product 200 to thereby retain product 200. Security tether 330 can be retracted within (and/or through) display stem 310 when product 200 is replaced on display stem 310.

Figure 5:
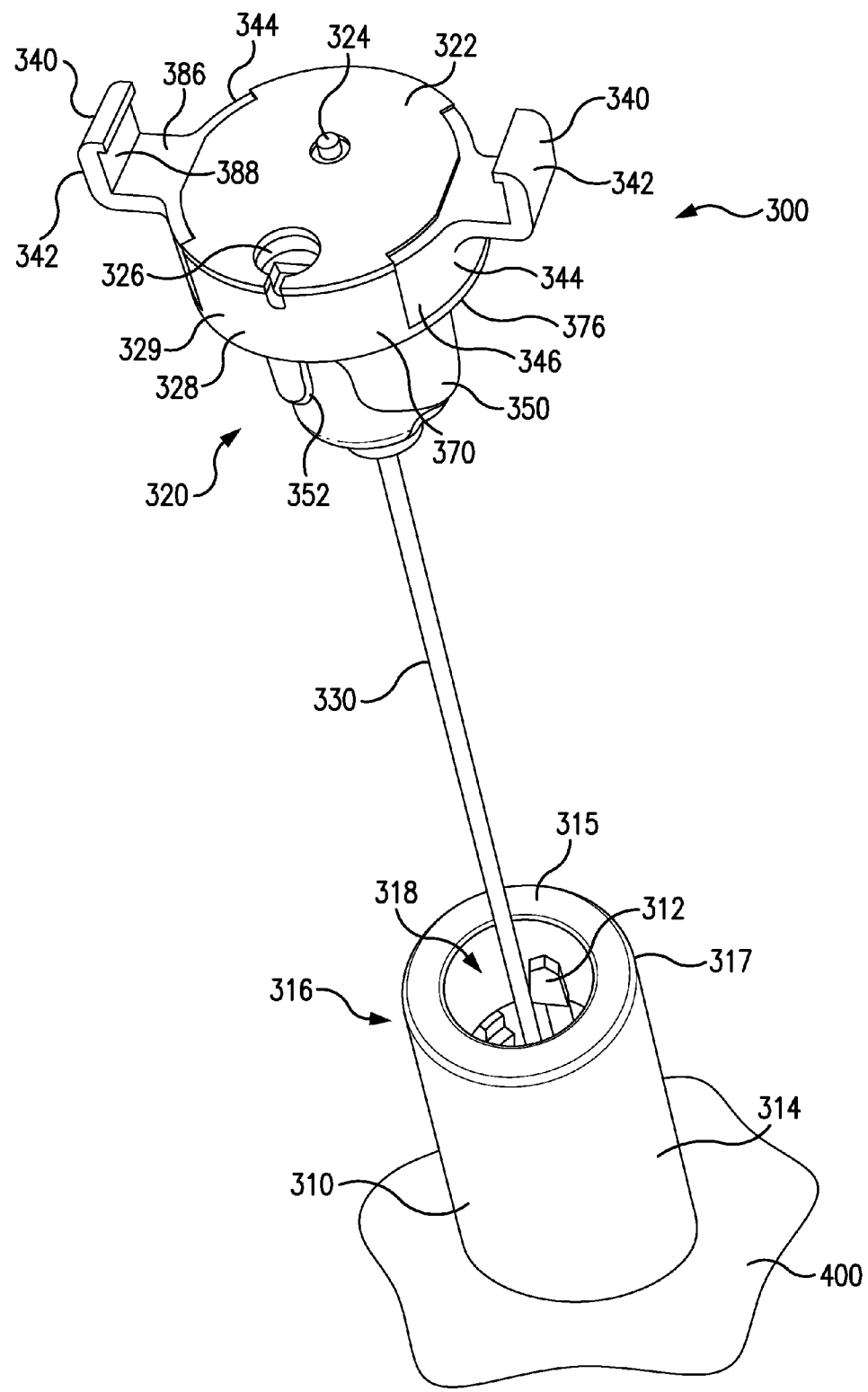
FIG. 5 is a perspective view of a portion of the system of FIG. 1 without a product.

In some embodiments, as shown, for example, in FIGS. 2 and 5, display stem 310 is cylindrical having a cylindrical outer surface 314, and an interior cavity 318, thereby defining a hollow tubular shape. In some embodiments, display stem 310 includes a mating surface 315 at a proximal end 317 of the display stem 310, where mating surface 315 extends between outer surface 314 and cavity 318 of display stem 310.

Figure 6:
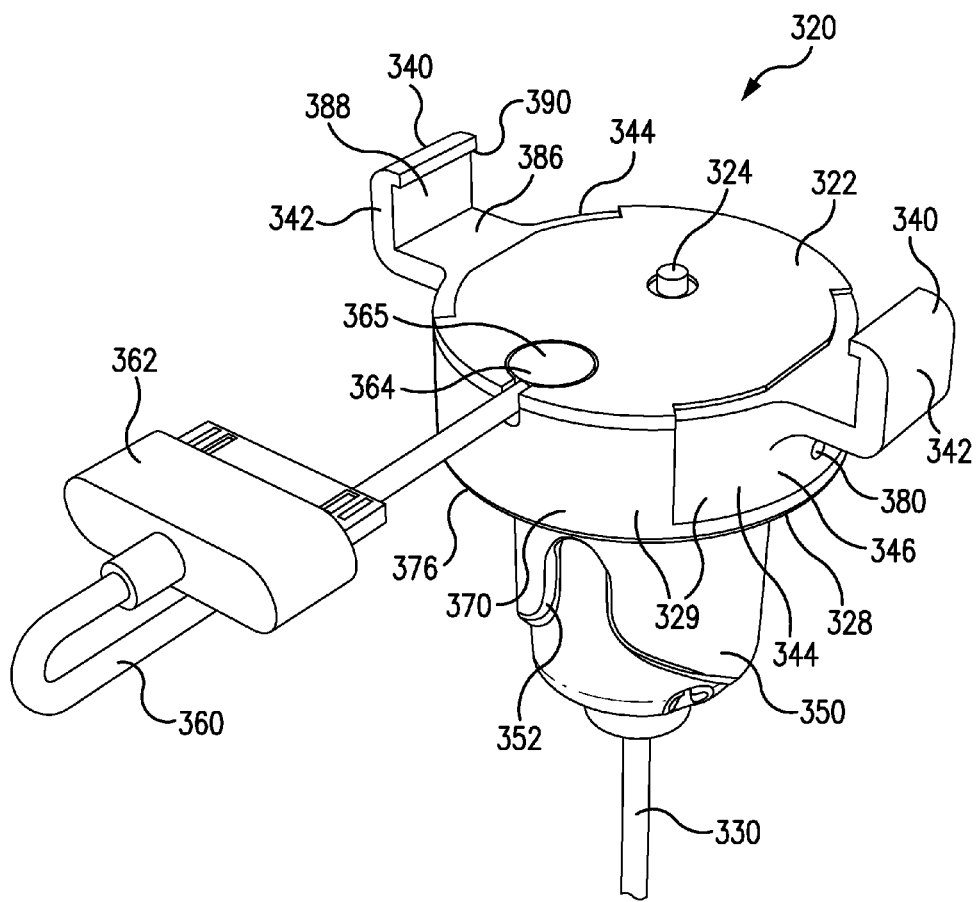
FIG. 6 is a perspective view of a portion of the system of FIG. 1.
Figure 7:
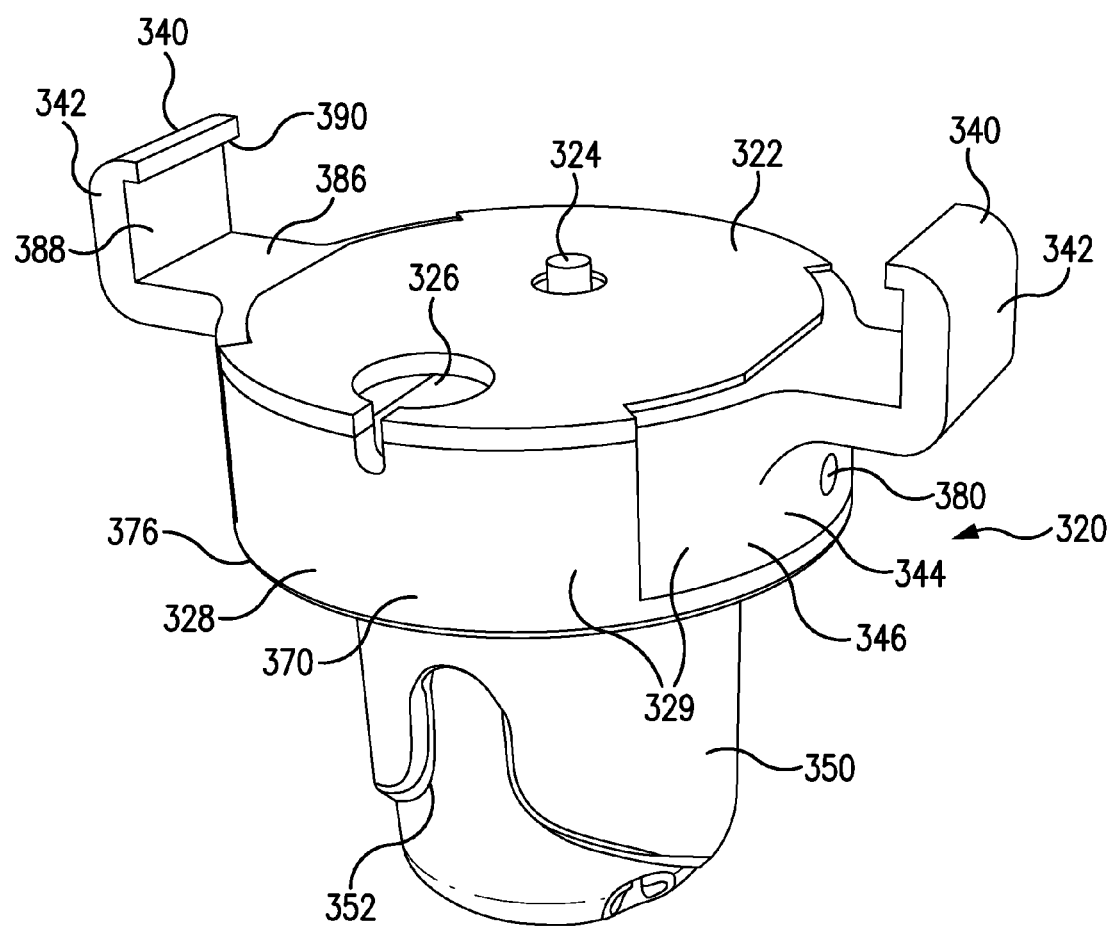
FIG. 7 is a perspective view of a portion of the system of FIG. 1.
Figure 8:
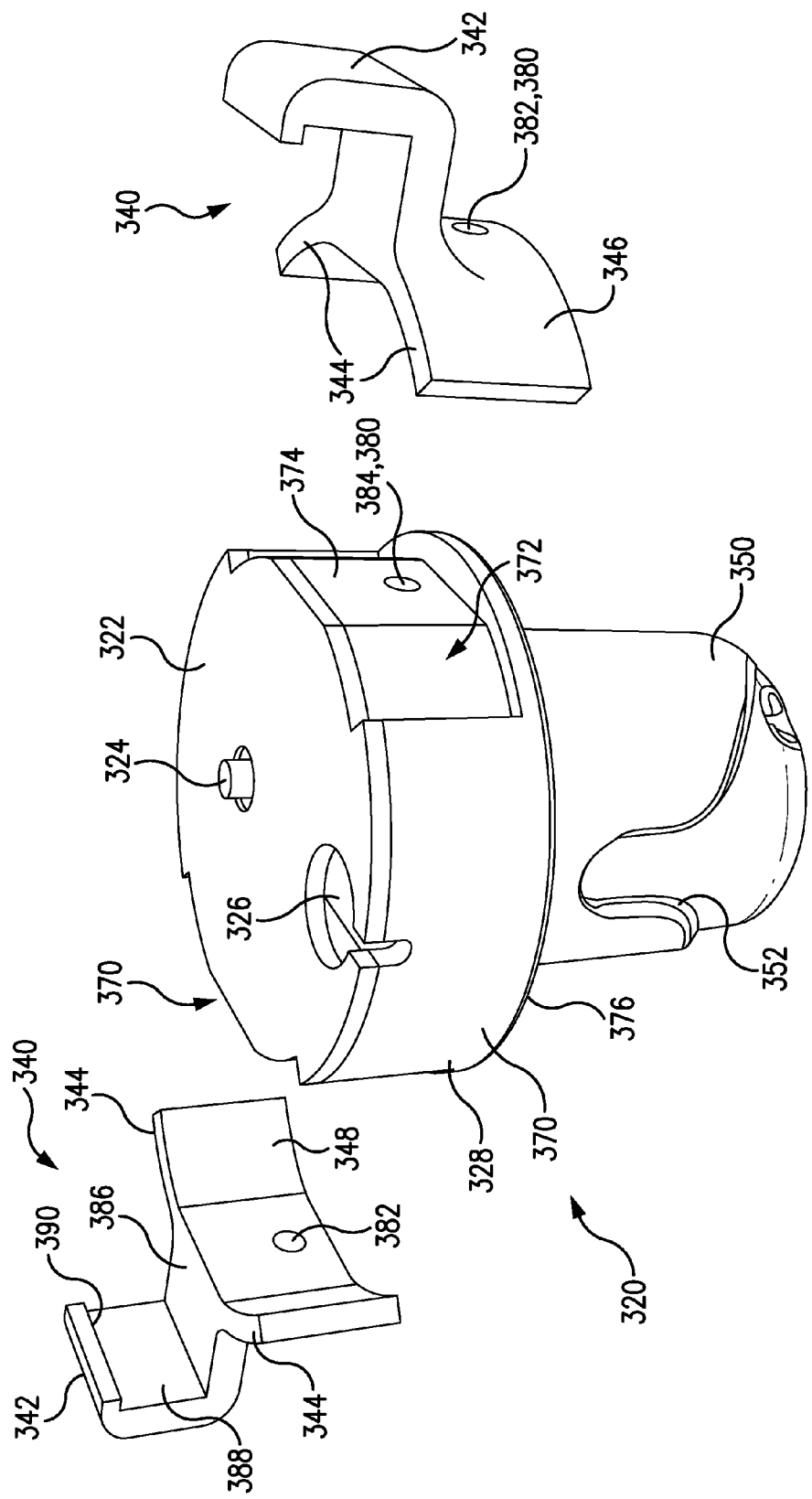
FIG. 8 is an exploded perspective view of a portion of the system of FIG. 1.

In some embodiments, as shown, for example, in FIGS. 3-8, retaining puck 320 includes a cylindrical main body 328 having a cylindrical side surface 329. In some embodiments, a puck protrusion 350 protrudes from a distal side of retaining puck 320. In some embodiments, retaining puck 320 includes one or more brackets 340. Each bracket 340 may include a mounting flange 344 disposed in a recess 372 of retaining puck main body 328 such that an outer surface of mounting flange 344 defines a portion of side surface 329 of main body 328. Each bracket 340 may further include a bracket arm 342 extending from mounting flange 344, where bracket arm 342 is configured to extend around a portion of product 200 to thereby couple product 200 to retaining puck 320. For example, as shown in FIGS. 7 and 8, each bracket arm 342 may include a rear retaining surface 386, a side retaining surface 388, and a top retaining surface 390, where rear retaining surface 386 conforms to a rear surface of product 200, side surface 388 conforms to a side surface of produce 200, and top surface 390 conforms to a top surface of product 200 (see, e.g., FIGS. 1-4).

In some embodiments, product 200 may be coupled to retaining puck 320 by one or more techniques, including by brackets 340. In some embodiments, bracket arms 342 may conform around sides of a product 200, as shown, for example, in FIGS. 1-4. In some embodiments, brackets 340 may alternatively or additionally include other fixing elements such as, for example, screws, snaps, rivets, buckles, detents, bolts, press fit, or adhesive (e.g., glue, epoxy, adhesive tape) to couple product 200 to retaining puck 320.

As shown in FIGS. 5 and 6, in some embodiments retaining puck 320 may be provided with a fixing element 322 to retain product 200. Fixing element 322 may be disposed to define a face of retaining puck 320 intended to come into contact with product 200. For example, fixing element 322 may be an adhesive, such as, for example, glue, epoxy, or adhesive tape (e.g., a double coated acrylic foam tape). In some embodiments, fixing element 322 may alternatively or additionally be a mechanical fastener such as, for example, a screw, snap, rivet, buckle, detent, bolt, or press fit.

In some embodiments, when product 200 is coupled to retaining puck 320, product 200 may engage for disengage) a security switch 324. Security switch 324 may be communicatively coupled to an alarm or other alert such that the alert can be triggered by removal of product 200 from retaining puck 320. Such removal of product 200 from retaining puck 320 may disengage (or engage) security switch 324, thereby triggering the alert.

Figure 9:
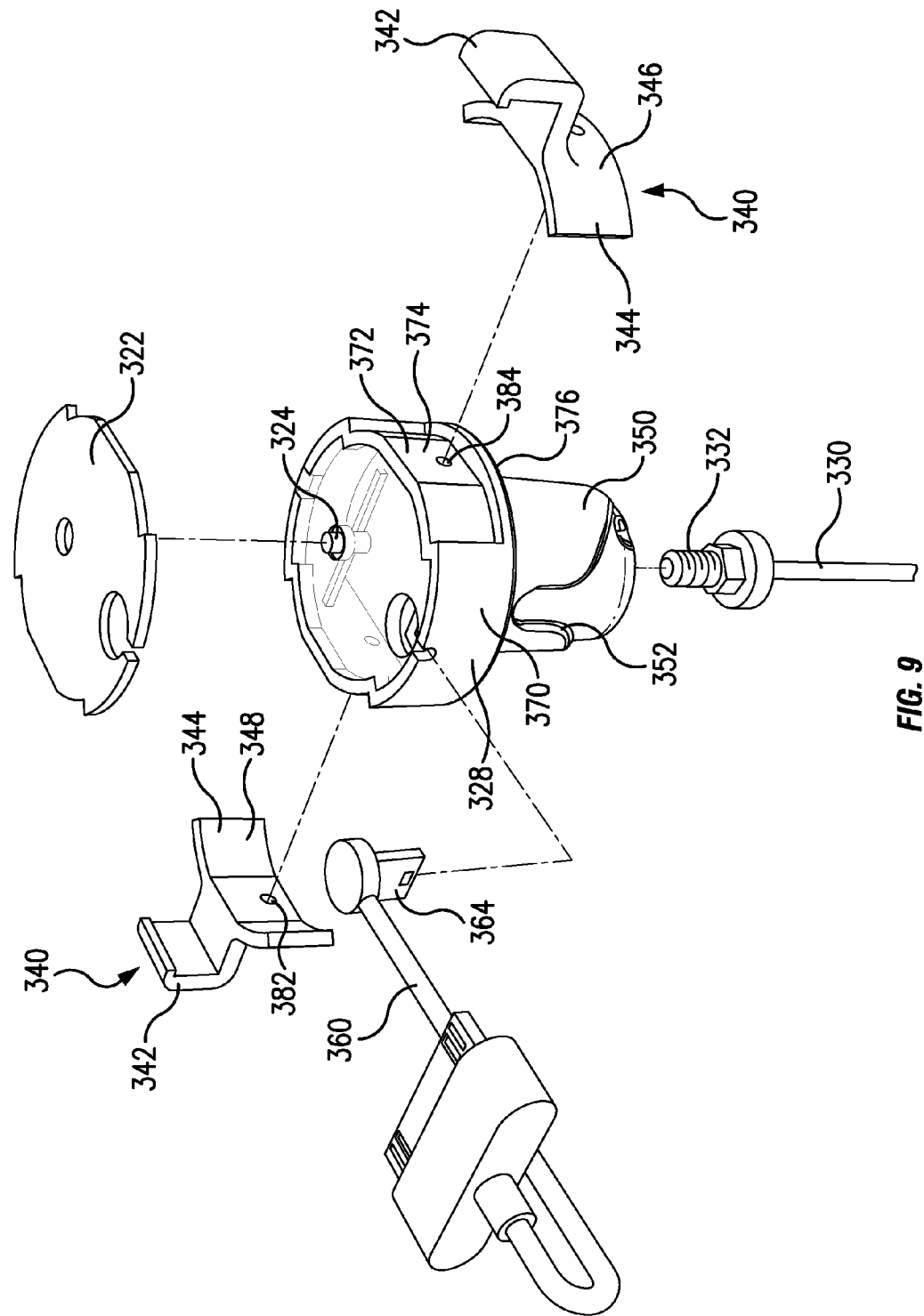
FIG. 9 is an exploded perspective view of a portion of the system of FIG. 1.

In some embodiments, security tether 330 can limit the distance that product 200 can be removed from display stem 310 or other anchor, and may be formed of for example, a chain, a mono, or poly-filament cable, a hollow tube, a rope, or any other suitable element. In some embodiments, security tether 330 may be flexible. In some embodiments, retaining puck 320 may be coupled to security tether 330, for example, at an end of security tether 330. Retaining puck 320 may be coupled to security tether 330 by a security tether coupling element 332 (see, e.g., FIG. 9) which may be any suitable coupling element, such as, for example, a screw (as shown in FIG. 9), snaps, rivets, buckles, detents, bolts, press fit, or adhesive (e.g., glue, epoxy, adhesive tape).

In some embodiments, security tether 330 may be coupled to an anchor that, along with security tether 330 and other elements of the display stand 300, can be used to limit the ability of a handler of product 200 to remove product 200 from a limited area. In some embodiments, the anchor is the display stem 310. In some embodiments, the anchor is another element (e.g., a fixture that display stem 310 is also coupled to, such as, for example, display surface 400). In some embodiments, security tether 330 may extend through display stem 310. In some embodiments, security tether 330 may retract (e.g., through display stem 310) automatically or manually toward its anchor, in order to limit the amount of play in security tether 330.

In some embodiments, retaining puck 320 may include a puck protrusion 350 extending from its main body 328 (see, e.g., FIGS. 3-9). Puck protrusion 350 may be sized and shaped to fit within display stem cavity 318 to thereby removably mount retaining puck 320 to proximal portion 316 of display stem 310. In some embodiments, the exterior surface of puck protrusion 350 is sized and shaped to mesh with the interior surface of display stem cavity 318. In some embodiments, the exterior surface of puck protrusion 350 includes a puck protrusion orienter 352 that corresponds to a display stem orienter 312, whereby interaction of puck protrusion orienter 352 and display stem orienter 312 orient retaining puck 320 (and coupled product 200) in one of at least one pre-determined orientations. For example, display stem orienter 312 may be a protrusion, and puck protrusion orienter 352 may be a recess shaped to receive the protrusion.

In some embodiments, retaining puck 320 includes a cable access 326, which may provide access for a cable or other linkage (see, e.g., FIG. 5) such as, for example, a product cable plug 364 of a product connector cable 360. Cable access 326 may be a cable pass-through through which a product cable can pass, or may be an outlet configured to receive a cable plug such as, for example, product cable plug 364. In this way, secured product 200 can receive power and/or data by being connected to a product connection end 362 of product connector cable 360, which, in the case of an electronic device, may facilitate its operation and testing by a potential purchaser.

In some embodiments, product cable plug 364 can be configured to fit within cable access 326 and can be formed to have a proximal surface 365 that aligns with fixing element 322, to minimize interruption of fixing element 322 thereby, and to minimize interference in establishing contact between product 200 and fixing element 322 when product 200 is fixed thereto.

Any suitable outlet and plug combination can be used at either end of product connector cable 360 to provide such power and/or data transmission through cable access 326 to product 200, such as, for example, Universal Serial Bus (USB), micro-USB, mini-USB, Advanced Technology Attachment (ATA) (e.g., Parallel ATA, Serial ATA), or any other standard or proprietary connection format. In some embodiments, cable access 326 can be coupled to a cable (e.g., a data and/or power cable) running through or itself forming security tether 330, which may in turn be coupled to a data and/or power source.

In some embodiments, brackets 340 may be coupled to a portion of retaining puck 320, such as, for example, puck main body 328 (see, e.g., FIGS. 7 and 8). The brackets 340 may be so coupled by any suitable bracket fixing element 380 such as, for example, screws, snaps, rivets, buckles, detents, bolts, press fit, or adhesive (e.g., glue, epoxy, adhesive tape). FIG. 8 shows a bracket fixing opening 382 in a mounting flange 344 of bracket 340, where bracket fixing opening 382 is configured to align with a bracket fixing opening 384 of puck main body 328. Such openings may receive a fastener such as, for example, a screw, to couple the bracket 340 to main body 328.

In some embodiments, mounting flange 344 of brackets 340 is received by a puck bracket recess 372 of retaining puck 320. Puck bracket recess 372 and mounting flange 344 may be sized and shaped to mate with each other such that a mounting flange inner surface 348 of bracket 340 meshes with a bracket recess surface 374 of puck bracket recess 372. In some embodiments these meshing surfaces have a non-constant curvature (e.g., three flat portions angled with respect to each other, as show, for example, in FIG. 8), which may help maintain the position and orientation of mounting flange 344 relative to puck bracket recess 372. Further, the sides of puck bracket recess 372 can inhibit relative motion of bracket 340 with respect to other portions of retaining puck 320, thereby reliably maintaining the position and orientation of bracket 340. In this way, mounting flange 344 can be consistently positioned at an intended location on retaining puck 320 corresponding to puck bracket recess 372.

Further, in some embodiments, when mounting flange 344 is mounted within puck bracket recess 372, a mounting flange outer surface 346 aligns with a puck side surface 370, where puck side surface 370 is the surface from which puck bracket recess 372 is recessed. Together, mounting flange outer surface 346 and puck side surface 370 define puck main body side surface 329. Alignment of surfaces generally occurs where surfaces sufficiently coincide at or near an interface therebetween so as to create a visual impression of continuity of shape. For example, in some embodiments, puck side surface 370 has substantially the same radius of curvature as mounting flange outer surface 346 such that, when aligned, these surfaces together define a continuous radius of curvature across their alignment interface.

In some embodiments, at least a portion of puck main body side surface 329 (e.g., side surface 370) is continuous (e.g., defining a portion of a cylindrical shape including, for example, a circular, ovoid, or frustoconical cylindrical shape) except for puck bracket recess 372. In this way, mounting brackets 340 may be mounted within puck bracket recess 372 without appearing to interrupt the shape of puck main body side surface 329, thereby preserving its aesthetic. The preserved aesthetic of puck main body side surface 329 helps maintain a consistent and aesthetically-pleasing appearance. Maintaining such a consistent and aesthetically-pleasing appearance avoids detracting from a potential purchaser's experience when viewing, handling, and testing product 200, and can thereby increase the potential for sales of product 200. The problem of maintaining such a consistent and aesthetically-pleasing appearance in a product display device, particularly in a retaining puck element, has not before been recognized, and thus conventional product display devices do not have these features as described.

Additionally, a curved shape is well suited for retaining puck 320, and in particular puck main body 328. The curved shape (e.g., a circular, ovoid, or frustoconical cylindrical shape) helps minimize the potential that a handler of product 200 will be able to remove retaining puck 320 from product 200. This is due in part to the absence or minimization of corners upon which a handler could apply leverage to remove product 200 (e.g., leverage to overcome the retention features of retaining puck 320, such as, for example, brackets 340 and/or fixing element 322). This is a further benefit to the consistent surface of puck main body side surface 329 defined by mounting flange outer surface 346 and puck side surface 370 when mounting flanges 344 of brackets 340 are mounted within puck bracket recesses 372. In some embodiments, mounting flange inner surface 348 has a different shape from mounting flange outer surface 346, in order to allow mounting flange inner surface 348 to mesh with bracket recess surface 374, and to allow mounting flange outer surface 346 to align with puck side surface 370. For example, mounting flange inner surface 348 may be defined by one or more flat surfaces (e.g., three flat surfaces angled with respect to each other, as shown in FIG. 8) while mounting flange outer surface 346 may be defined by a continuously curved surface (e.g., a circular arc surface, as shown in FIG. 8). As described, puck side surface 370 and bracket recess surface 374 may have different shape characteristics.

In some embodiments, a portion of retaining puck 320 may be removably coupled to display stem 310 to effect display of product 200 (e.g., puck protrusion 350 may be received by display stem cavity 318, as shown in, for example, FIGS. 1 and 2). In some embodiments, a portion of retaining puck 320 may protrude from display stem 310. For example, a mating surface 378 of puck main body 328 may rest upon a mating surface 315 of proximal portion 316 of the display stem 310 (see, e.g., FIG. 10). In some embodiments, puck main body side surface 329 (the surface of retaining puck 320 defined by mounting flange outer surface 346 and puck side surface 370) may align with proximal portion 316 of display stem outer surface 314, to thereby effect a consistent and aesthetically-pleasing appearance, so as not to detract from a potential purchaser's experience when viewing displayed product 200. In other words, display stem 310 may have an outer surface 314 defining a shape at its proximal portion 316 that corresponds to a shape defined by puck main body side surface 329.

For example, in some embodiments, outer surface 314 of proximal portion 316 of display stem 310 may be circular at a proximal end 317 thereof, and puck main body side surface 329 may be circular at a distal end 376 thereof (see FIG. 5). The circular distal end 376 and the circular proximal end 317 may have substantially the same diameters, so as to maintain a consistent and aesthetically-pleasing appearance across the alignment interface of aligned surfaces of retaining puck 320 and display stem 310 (see FIG. 10). Maintaining such a consistent and aesthetically-pleasing appearance avoids detracting from a potential purchaser's experience when viewing displayed product 200, and can thereby increase the potential for sales of product 200. The problem of maintaining such a consistent and aesthetically-pleasing appearance in a product display device, particularly between a display stem element and a retaining puck element resting thereon, has not before been recognized, and thus conventional product display devices do not have these features as described.

For example, as shown in FIG. 10, the cylindrical display stem outer surface 314 aligns with the cylindrical puck main body side surface 329 to create the impression of a consistent cylindrical shape defined by these surfaces together. In some embodiments, orienters 312, 352 (see FIG. 5) may be configured to promote such alignment (e.g., where these surfaces together define a non-circular shape, where one of at least one orientations is required to align the surfaces as described).

In some embodiments, a retailer or other person may display a product by fixing product 200 to be displayed to retaining puck 320 as described above (e.g., using a fixing element 322). As described, retaining puck 320 may include main body 328 having at least a partially continuous side surface 370 and bracket 340 mounted thereto at puck bracket recess 372 thereof such that outer surface 346 of bracket mounting flange 344 is aligned with the continuous portion of side surface 370 to define puck main body side surface 329. Further, the retailer or other person may position mating surface 378 of puck main body 328 in contact with mating surface 315 of display stem 310, and may align puck main body side surface 329 with outer surface 314 of at least proximal portion 316 of display stem 310, to thereby effect display of product 200.

The foregoing description of the specific embodiments of the display stand system described with reference to the figures will so fully reveal the general nature of the invention that others can, by applying knowledge within the skill of the art, readily modify and/or adapt for various applications such specific embodiments, without undue experimentation, without departing from the general concept of the present invention. For example, although the display stand system has been described herein generally with reference to cylindrical conformance in surfaces among display stem 310, puck side surface 370, and mounting flange outer surface 346, the systems and methods described herein can also be employed to effect conformance in surfaces to define shapes other than cylindrical such as, for example, shapes having an ovoid, triangular, rectangular, pentangular, or other regular or irregular polygonal cross-section.

Also, for example, in some embodiments display stand system 100 may not include a display stem. In such embodiments, retaining puck 320 may be received by another element (e.g., a hole in a table surface), or not at all.

While various embodiments of the present invention have been described above, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present invention. The elements of the embodiments presented above are not necessarily mutually exclusive, but may be interchanged to meet various needs as would be appreciated by one of skill in the art.

It is to be understood that the phraseology or terminology used herein is for the purpose of description and not of limitation. The breadth and scope of the present invention should not be limited by any of the above-described exemplary embodiments, but should be defined only in accordance with the following claims and their equivalents.

What is claimed is:

1. A retaining puck for retaining a product, the retaining puck comprising:
    a main body; and
    two bracket arms extending from the main body in opposite directions, wherein each of the bracket arms is attached to the main body by a mounting flange received in a bracket recess of the main body,
    wherein an outer surface of each mounting flange has an arcuate curvature around a portion of the main body; and
    wherein the arcuate curvature defines a portion of a side surface of the main body.

2. The retaining puck of claim 1, wherein the outer surface of each mounting flange defines a portion of a cylindrical shape.

3. The retaining puck of claim 1, wherein the side surface of the main body and the outer surface of each mounting flange together define a cylindrical shape.

4. The retaining puck of claim 1, wherein the side surface of the main body and the outer surface of each mounting flange have the same radius of curvature.

5. The retaining puck of claim 1, wherein each mounting flange has an inner surface that has a different shape from its outer surface.

6. The retaining puck of claim 5, wherein each inner surface is defined by one or more flat surfaces, and
    wherein each outer surface is defined by a continuously curved surface.

7. A display system, comprising:
    the retaining puck of claim 1; and
    a display stem having an interior cavity at its proximal end for receiving a portion of the puck,
    wherein the outer surface of the mounting flange aligns with an outer surface of the display stem at its proximal portion when the portion of the puck is received within the interior cavity of the display stem.

8. The display system of claim 7, wherein the side surface of the main body, the outer surface of each mounting flange, and the outer surface of the proximal portion of the display stem together define a cylindrical shape.

9. The display system of claim 7, wherein an outer diameter of the retaining puck is the same as an outer diameter of the display stem.

10. The display system of claim 7, wherein the outer surface of the display stem at its proximal portion is aligned with the outer surface of each mounting flange when the portion of the retaining puck is received within the interior cavity of the display stem.

11. The display system of claim 7, comprising:
a product connector cable having a product cable plug coupled to the retaining puck, wherein the product cable plug is configured to receive power or data through the coupling with the retaining puck and to transmit the power or data to a product coupled to a product connection end of the product connector cable.

12. A display system, comprising:
a retaining puck comprising a bracket having a mounting flange and a bracket arm extending from the mounting flange and configured to extend around a portion of a product to thereby couple the product to the retaining puck, wherein the retaining puck has a side surface defined at least in part by the mounting flange; and
a display stem having a side surface defining a shape at its proximal portion that corresponds to a shape defined by the side surface of the retaining puck,
wherein the side surface of the retaining puck defined by the mounting flange is aligned with the proximal portion of the side surface of the display stem when the retaining puck is coupled to the display stem, and
wherein the side surface of the retaining puck defined in part by the mounting flange has a cross-sectional shape that corresponds to the cross-sectional shape of the proximal portion of the side surface of the display stem.

13. The display system of claim 12, wherein the outer surface of the display stem at its proximal portion and at least a portion of the side surface of the retaining puck together define a cylindrical shape.

14. The display system of claim 12, wherein the retaining puck further comprises a second bracket having a mounting flange,
wherein at least a portion of the side surface of the retaining puck is defined by the second mounting flange,
wherein the side surface of the retaining puck defined by the second mounting flange is aligned with the proximal portion of the side surface of the display stem when the retaining puck is coupled to the display stem, and
wherein the first bracket and the second bracket each comprise a bracket arm, and wherein the bracket arms extend in opposite directions.

15. The display system of claim 12, wherein the outer surface of the display stem and the side surface of the retaining puck together define at least a semi-cylindrical shape.

16. A method for displaying a product, the method comprising:
fixing a product to a retaining puck, wherein the retaining puck comprises:
a main body; and
two bracket arms extending from the main body in opposite directions, wherein each of the bracket arms is attached to the main body by a mounting flange received in a bracket recess of the main body, wherein an outer surface of each mounting flange has an arcuate curvature around a portion of the main body, and wherein the arcuate curvature defines a portion of a side surface of the main body; and
aligning the outer surface of each mounting flange with an outer surface of at least a proximal portion of a display stem.

17. The method of claim 16, comprising positioning a mating surface of the retaining puck in contact with a mating surface of the display stem.

18. The retaining puck of claim 1, wherein each bracket arm has an end portion opposite its mounting flange, and wherein the end portion of each bracket anti curves to point toward the end portion of its opposing bracket arm.

19. The retaining puck of claim 1, wherein a top surface of the retaining puck is formed in part by top surfaces of the bracket arms.

20. The retaining puck of claim 1, wherein the bracket arms together define a space within which a product can be retained relative to the retaining puck by the bracket arms.

21. The retaining puck of claim 1, wherein the mounting flanges and the main body are not movable relative to each other when the bracket arms are attached to the main body.

22. The retaining puck 12, wherein the side surface of the retaining puck defined in part by the mounting flange has a circular cross-sectional shape and the proximal portion of the side surface of the display stem has a circular cross-sectional shape with a diameter that is substantially the same as the diameter of the side surface of the retaining puck defined in part by the mounting flange.

* * * * *